Feb. 27, 1934.   J. RESTEIN   1,948,630
PACKING
Filed March 22, 1930
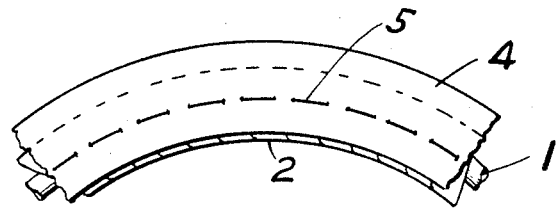
FIG.1.
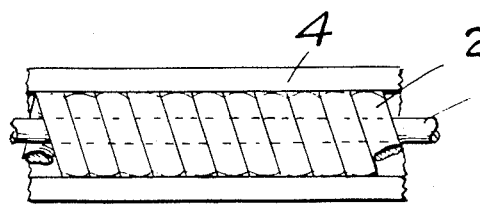 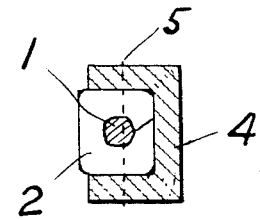
FIG.2.   FIG.3.
 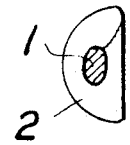
FIG.4.   FIG.5.
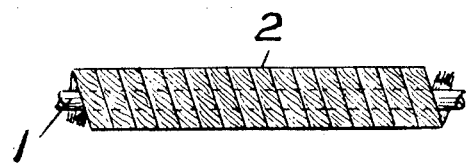 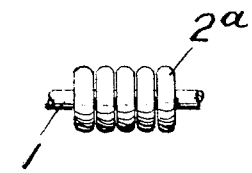
FIG.6.   FIG.7.
INVENTOR
Jules Restein
BY
Augustus B. Stoughton
ATTORNEY
WITNESS:
Rob R Kitchel Patented Feb. 27, 1934

1,948,630

UNITED STATES PATENT OFFICE 1,948,630

PACKING

Jules Restein, Philadelphia, Pa., assignor, by mesne assignments, to The Belmont Packing & Rubber Company, Philadelphia, Pa., a corporation of Pennsylvania Application March 22, 1930. Serial No. 438,058

2 Claims. (Cl. 154—45.5)

Objects of the present invention are to provide a metallic packing which can be simply, expeditiously and comparatively inexpensively manufactured and which in use is efficient, tight and durable; to provide such a packing which can be made in a wide range of sizes and from an extensive variety of metals; to provide such a packing that can be used for a wide variety of purposes involving a large range of temperature; and to provide a packing which under gland and other pressure in use will insure a tight and durable fit on a rod without creating undue or objectionable friction and with capacity for adjustment for long wear.

Other objects of the invention will appear from the following description at the end of which the invention will be claimed, and the invention may be said to comprise, generally stated, a packing comprising a metal core of generally circular cross-section having thereon and in metal to metal contact therewith turns of metal of generally circular cross section internally circular and externally presenting at least one flat face.

The invention also comprises the improvements to be presently described and finally claimed.

In the following description reference will be made to the accompanying drawing forming part hereof and in which Figure 1 is a view of a part of a strip of packing embodying features of the invention.

Fig. 2 is an edge view of the same.

Fig. 3 is a cross-sectional view of Fig. 2.

Figs. 4 and 5 are cross-sectional views of a metallic packing embodying features of the invention and showing modifications in external form.

Fig. 6 is an edge view illustrating a modification, and

Fig. 7 is a similar view illustrating another modification.

Referring to the drawing, Figs. 1 to 3, 1 indicates a metallic core of generally circular cross-section. In metal to metal contact with the core 1 there are turns 2 of metal. Internally the turns 2 of metal are generally circular conforming to the cross-section of the core 1. Externally the turns 2 of metal present at least one flat surface. In Fig. 3 there are four flat surfaces, in Fig. 4 there are three flat surfaces, and in Fig. 5 there is one flat surface. The turns of metal may comprise a helical winding, as in Figs. 1 to 6, or they may comprise rings 2ª, as in Fig. 7. In Fig. 6 the turns of metal are made up of strands, whereas in the other figures they are solid.

The character of metal employed depends upon the use to which the packing is to be put. For relatively low temperatures lead or lead alloy is appropriate and for high temperatures other appropriate metals as copper, bronze or the like are appropriate. The turns may be put upon the metal core 1 in metal to metal contact with it and then the strip can be pressed deforming the cross-section of the turns and providing at least one flat surface on the outside of the strip, the rest of the surface being of any form desired. In the drawing I have illustrated a strip 4 as of duck and rubber having therein an open channel in which the described metallic packing is arranged and in which it is held by a line of stitching 5. Of course desired or usual lubricants may be provided although no attempt is made to illustrate the same.

In use, under gland pressure, the metal to metal contact between the turns and core permits the contact face of the metal packing with the rod to provide proper contact which can be readily maintained by adjustment in case of wear.

It may be said that pressure exerted upon the packing, vertical in the drawing, when the packing is in a gland or box, has the effect to force the flat face, that contacts with the rod, toward the center of the box or gland and the facility and certainty with which this occurs are due to the metal to metal contact between the turns and the core which is an important feature of the invention.

It will be obvious to those skilled in the art to which the invention relates that modifications may be made in details of construction and arrangement and matters of mere form without departing from the spirit of the invention which is not limited to such matters or otherwise than the prior art and the appended claims may require.

I claim:

1. A packing comprising an uncoiled metal core of generally circular cross-section having thereon and in metal to metal abutting contact therewith a single layer of turns of metal of generally circular cross section internally circular and externally presenting at least one flat face, a strip of fibrous material having an open channel in which the metal structure is arranged, and a line of stitches penetrating the walls of the fibrous strip and the metallic structure.

2. A packing comprising a metal core of generally circular cross section, a coil of metal of generally circular cross section wrapped about said core in a single layer of helical turns having metal to metal abutting contact with said core, a strip of fibrous material having a channel in which said core and said coil are located so that a face of said coil projects from said strip, said strip having a face parallel to the projecting face of said coil, and a line of stitches penetrating the walls of said strip of fibrous material and said coil and said core.

JULES RESTEIN.